United States Patent
Ahn

(10) Patent No.: US 11,294,508 B2
(45) Date of Patent: Apr. 5, 2022

(54) INTEGRATED CIRCUIT FOR DRIVING PANEL AND DISPLAY DEVICE INCLUDING THE SAME

(71) Applicant: SILICON WORKS CO., LTD., Daejeon (KR)

(72) Inventor: Yong Sung Ahn, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 0 days.

(21) Appl. No.: 17/167,577

(22) Filed: Feb. 4, 2021

(65) Prior Publication Data

US 2021/0255753 A1    Aug. 19, 2021

(30) Foreign Application Priority Data

Feb. 18, 2020 (KR) .................. 10-2020-0019676

(51) Int. Cl.
  *G06F 3/041*  (2006.01)
  *G06F 3/044*  (2006.01)
  *G09G 3/3291*  (2016.01)

(52) U.S. Cl.
  CPC .......... *G06F 3/04184* (2019.05); *G06F 3/044* (2013.01); *G09G 3/3291* (2013.01); *G06F 2203/04101* (2013.01); *G09G 2310/08* (2013.01)

(58) Field of Classification Search
  CPC ....... G06F 2203/04101; G06F 3/04184; G06F 3/044; G09G 2310/08; G09G 3/3291
  See application file for complete search history.

(56) References Cited

U.S. PATENT DOCUMENTS

| 9,857,911 | B1* | 1/2018 | Qu | G06F 3/04166 |
| 2014/0253535 | A1* | 9/2014 | Lim | G09G 5/008 345/213 |
| 2019/0129564 | A1* | 5/2019 | Kim | G09G 3/3688 |
| 2019/0155432 | A1* | 5/2019 | Park | G09G 3/2096 |
| 2020/0105214 | A1* | 4/2020 | Matsui | G02F 1/13338 |

FOREIGN PATENT DOCUMENTS

| KR | 10-1604781 B1 | 3/2016 |
| KR | 10-2018-0024904 A | 3/2018 |
| KR | 10-2019-0079166 A | 7/2019 |

* cited by examiner

*Primary Examiner* — Hong Zhou
(74) *Attorney, Agent, or Firm* — Fenwick & West LLP

(57) ABSTRACT

According to an embodiment, it is possible to efficiently use resources by restoring a clock from an image signal including a clock in image data and using the restored clock in a section in which the image signal is not received.

12 Claims, 9 Drawing Sheets

INTEGRATED CIRCUIT FOR DRIVING PANEL AND DISPLAY DEVICE INCLUDING THE SAME

CROSS REFERENCE TO RELATED APPLICATION

This application claims priority from Republic of Korea Patent Application No. 10-2020-0019676, filed on Feb. 18, 2020, which is hereby incorporated by reference in its entirety.

BACKGROUND

1. Field of Technology

The present embodiment relates to an integrated circuit including a data driving circuit and a touch sensing circuit, and an interface for data transmission in a display device including the integrated circuit.

2. Description of the Prior Art

The display device may include a panel and a panel driving circuit for driving the panel. The panel includes a plurality of pixels arranged side by side in a horizontal direction and a vertical direction so as to form a matrix. In addition, the panel may also include a plurality of touch electrodes for sensing a touch or proximity of an external object.

The panel driving circuit may drive pixels and touch electrodes of the panel. The panel driving circuit may include a data driving circuit and a touch sensing circuit. The data driving circuit may drive the panel by determining a data voltage according to image data and supplying the data voltage to the pixels. The touch sensing circuit may drive the panel by sensing a change in capacitance of touch electrode touched by or located adjacent to an external object.

The data driving circuit and the touch sensing circuit are collectively referred to as the panel driving circuit, but the data driving circuit and the touch sensing circuit may be separately located near the panel. For example, the data driving circuit may be disposed under the panel, and may receive image data from outside the data driving circuit via an interface. The touch sensing circuit may be disposed on the upper side of the panel, and may transmit touch sensing data to outside the touch sensing circuit via another interface.

In particular, the touch sensing circuit may use an interface called a serial peripheral interface (SPI) when transmitting touch sensing data or receiving a control signal. However, the SPI may have the following problems.

First, since the SPI continuously generates a clock even when the touch sensing circuit is not operating, waste of resources may occur. The touch sensing circuit may receive a clock from a microcontroller via the SPI, generate touch sensing data using the clock, and transmit the touch sensing data back to the microcontroller. However, in the SPI, the microcontroller may continuously generate the clock and transmit the clock to the touch sensing circuit even during a period in which the touch sensing circuit is not operating, for example, while the panel is performing display operation. The clock generated during the period in which the touch sensing circuit does not operate may be unnecessary for the touch sensing circuit.

In addition, the SPI may increase electromagnetic interference (EMI). In general, the SPI has a large signal swing range. For example, the signal swing range in other interfaces is 200 mV to 300 mV, while the signal swing range in the SPI may reach 3.3V. The swing range is positively related to electromagnetic interference, and a high swing range may cause high electromagnetic interference.

SUMMARY

The present embodiment provides an integrated circuit that efficiently uses resources of a panel driving circuit and reduces electromagnetic interference, and a data transmission interface for the integrated circuit.

One objective of the present embodiment is to provide an interface technique for transmitting touch sensing data in an integrated circuit including a data driving circuit and a touch sensing circuit.

Another objective of the present embodiment is to provide a technique for restoring a clock from an image signal including the clock in image data and using the restored clock for touch sensing.

Another objective of the present embodiment is to provide a technique for restoring a clock from an image signal including the clock in image data, and using the restored clock in a section in which the image signal is not received.

In order to achieve the objectives described above, an embodiments provides an integrated circuit including a receiving circuit configured to receive an image signal having a clock embedded therein, a clock data restoration circuit configured to restore the clock from the image signal, a readout circuit configured to generate a touch sensing signal for a touch or proximity of an external object; and a transmitting circuit configured to transmit the touch sensing signal to outside the integrated circuit using the restored clock.

In the integrated circuit, the clock data restoration circuit may be configured to restore the clock in a first section in which the image signal is received and to maintain the clock, restored in the first section, in a second section in which the image signal is not received.

In the integrated circuit, the transmitting circuit may be configured to transmit the touch sensing signal to outside the integrated circuit in the second section.

In the integrated circuit, the clock data restoration circuit may include a voltage-controlled oscillator configured to control a phase of the clock in response to a control voltage and may be configured to restore the clock using the voltage-controlled oscillator.

In the integrated circuit, the clock data restoration circuit may include an oscillation control circuit configured to control the voltage-controlled oscillator by adjusting the control voltage, the oscillation control circuit may be configured to adjust the control voltage during the first section, and the voltage-controlled oscillator may be configured to restore the clock according to the control voltage during the first section.

In the integrated circuit, the oscillation control circuit may be configured to fix the control voltage during the second section, and the voltage-controlled oscillator may be configured to maintain the clock according to the fixed control voltage.

In the integrated circuit, the receiving circuit may be configured to receive the image signal using a first interface, and the transmitting circuit may be configured to transmit the touch sensing signal using a second interface different from the first interface.

In the integrated circuit, in the first interface, a clock is transmitted in a state of being embedded in data and in the second interface, a clock is transmitted separately from data.

In the integrated circuit, the receiving circuit may be configured to receive a touch sensing control signal for setting the readout circuit via the first interface.

Another embodiment provides a display device including a timing controller configured to transmit an image signal having a clock embedded therein, and an integrated circuit configured to generate a touch sensing signal for a touch or proximity of an external object and to transmit the touch sensing signal to outside the integrated circuit. The integrated circuit is configured to restore the clock from the image signal and to transmit the touch sensing signal to the timing controller using the restored clock.

In the display device, the timing controller may be configured to transmit the image signal using a first interface, and the integrated circuit may be configured to transmit the touch sensing signal to the timing controller using the restored clock via a second interface different from the first interface.

In the display device, the integrated circuit may be configured to restore the clock in a first section in which the image signal is received and to output a data voltage corresponding to the image data using the restored clock.

In the display device, the integrated circuit may be configured to transmit the touch sensing signal to the timing controller using the clock, restored in the first section, in a second section in which the image signal is not received.

In the display device, the integrated circuit may include a voltage-controlled oscillator configured to control a phase of the clock according to a control voltage and an oscillation control circuit configured to control the voltage-controlled oscillator by adjusting the control voltage, the oscillation control circuit may be configured to adjust the control voltage during the first section in which the image signal is received and to fix the control voltage during the second section in which the image signal is not received, and the oscillator may be configured to restore the clock according to the control voltage adjusted during the first section and to generate the clock according to the control voltage fixed during the second section.

In the display device, the display device may further include a microcontroller configured to receive the touch sensing signal from the timing controller.

In the display device, the timing controller may be configured to transmit the touch sensing signal to the microcontroller using a third interface different from the first interface configured to transmit the image signal and the second interface configured to transmit the touch sensing signal.

As described above, according to the present embodiment, by using a clock restored from image data in a section in which the image data is not received, it is possible to achieve efficient use of resources.

In addition, according to the present embodiment, by changing the interface for transmitting touch sensing data in an integrated circuit including a data driving circuit and a touch sensing circuit, it is possible to reduce electromagnetic interference without using a clock at a transistor-transistor logic (TTL) level.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
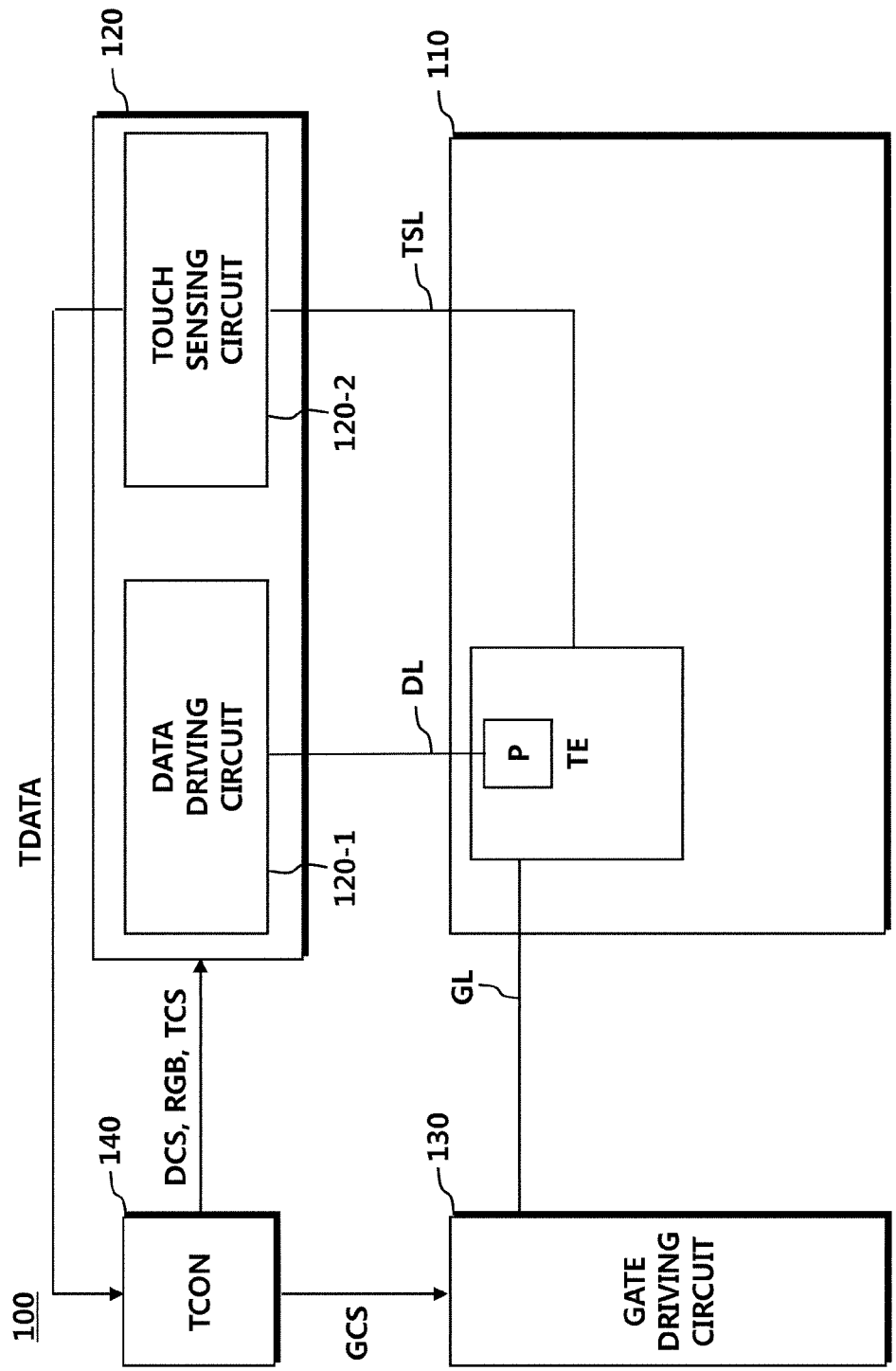
FIG. 1 is a block diagram of a display device according an embodiment.

FIG. 1 is a block diagram of a display device according an embodiment.

Referring to FIG. 1, a display device 100 may include a panel 110 and panel driving circuits 120, 130, and 140 configured to drive the panel 110.

On the panel 110, a plurality of data lines DL connected to a data driving circuit 120-1, a plurality of gate lines GL connected to a gate driving circuit 130, and a plurality of sensing lines TSL connected to a touch sensing circuit 120-2 may be arranged. In addition, on the panel 110, a plurality of pixels P corresponding to the intersections of the plurality of data lines DL and the plurality of gate lines GL may be arranged.

Each pixel P may be provided with a transistor in which a first electrode (e.g., a source electrode or a drain electrode) is connected to a data line DL, a gate electrode is connected to a gate line GL, and a second electrode (e.g., a drain electrode or a source electrode) is connected to a display electrode.

In addition, a plurality of touch electrodes TE may be further arranged on the panel 110 to be spaced apart from each other. One or more pixels P may be located in the region where a touch electrode TE is located.

The panel 110 may include a display panel (DP) and a touch screen panel (TSP), wherein the display panel and the touch screen panel may share some components with each other. For example, the plurality of touch electrodes TE may be a component of the display panel (e.g., common electrodes for applying a common voltage), and may be a component of the touch screen panel (e.g., touch electrodes for sensing a touch). In view of the fact that some components of the display panel and the touch screen panel are shared with each other, this panel 110 is also referred to as an integral-type panel. However, the present embodiment is not limited thereto. In addition, although an in-cell-type panel is known as a type in which some components of the display panel and the touch screen panel are shared with each other. However, this is merely an example of the above-mentioned panel 110, and a panel to which the present disclosure is applied is not limited to the in-cell-type panel.

Meanwhile, the panel 110 may be an OLED (organic light-emitting diode) panel. In this case, each of the pixels P disposed on the panel 110 may include an OLED and one or more transistors.

Circuits 120, 130, and 140 for driving at least one component included in the panel 110 may be referred to as a panel driving circuit. For example, an integrated circuit (IC) 120, a gate driving circuit 130, a timing controller (TCON) 140, or the like may be referred to as a panel driving circuit. Each of the above-described circuits 120, 130, and 140 may be referred to as a panel driving circuit, and all or a plurality of circuits may be referred to as a panel driving circuit.

In the panel driving circuit, the gate driving circuit 130 may supply a scan signal of a turn-on voltage or a turn-off voltage to a gate line GL. When a scan signal of the turn-on voltage is supplied to a pixel P, the pixel P is connected to a data line DL, and when a scan signal of the turn-off voltage is supplied to a pixel P, the corresponding pixel P and data line (DL) are disconnected.

In the panel driving circuit, the timing controller 140 may supply various control signals to the gate driving circuit 130 and the integrated circuit 120. The timing controller 140 may generate a gate control signal GCS for starting scanning according to a timing implemented in each frame and transmit the gate control signal GCS to the gate driving circuit 130.

The timing controller 140 may receive image data RGB from an external device, convert the image data RGB to be suitable for the data driving circuit 120-1 of the integrated circuit 120, and output converted image data RGB to the integrated circuit 120. In addition, the timing controller 140 may transmit a data control signal DCS for controlling the data driving circuit 120-1 to supply a data voltage to each pixel P according to each timing.

The timing controller 140 may transmit a touch control signal TCS for controlling a touch sensing circuit 120-2 to sense a touch or proximity of an external object by supplying a driving signal to the touch electrodes TE. In addition, the timing controller 140 may receive touch sensing data TDATA from the touch sensing circuit 120-2. The touch sensing data TDATA may include a measurement value of a change in capacitance of the touch electrodes TE.

In the panel driving circuit, the integrated circuit 120 may include a data driving circuit 120-1 and a touch sensing circuit 120-2. Since the function of data driving and the function of touch sensing are integrated into the integrated circuit 120, the integrated circuit 120 is capable of performing both the data driving operation and the touch sensing operation.

In the integrated circuit 120, the data driving circuit 120-1 may supply a data voltage to a data line DL. The data voltage supplied to the data line DL may be transmitted to a pixel P connected to the data line DL according to a scan signal.

The data driving circuit 120-1 may be connected to a bonding pad of the panel 110 through a tape automated bonding (TAB) method or a chip on glass (COG) method, or may be formed directly on the panel 110. In some cases, the data driving circuit 120-1 may be integrated in the panel 110. In addition, the data driving circuit 120-1 may be implemented through a chip on film (COF) method.

In the integrated circuit 120, the touch sensing circuit 120-2 may apply a driving signal to all or some of the plurality of touch electrodes TE connected to the sensing line TSL.

In addition, although the drawing illustrates one touch sensing circuit 120-2 arranged in the display device 100, the display device 100 may include two or more touch sensing circuits 120-2.

Meanwhile, in order for the touch sensing circuit 120-2 to apply a driving signal to all or some of the plurality of touch electrodes TE, a sensing line TSL connected to each of the plurality of touch electrodes TE is required. Accordingly, the sensing line TSL, which is connected to each of the plurality of touch electrodes TE to transmit a driving signal, may be arranged on the panel 110 in a first direction (e.g., a vertical direction) or a second direction (e.g., a horizontal direction).

Meanwhile, the display device 100 may adopt an electrostatic capacitive touch method in which a touch or proximity of an external object is recognized by sensing a change in electrostatic capacitance through the touch electrodes TE.

Such a capacitive touch method may be classified into, for example, a mutual capacitive touch method and a self-capacitive touch method.

The mutual capacitive touch method, which is a type of capacitive touch method, may apply a driving signal to a touch electrode (Tx electrode) and sense another touch electrode (Rx electrode) mutually coupled with the Tx electrode. In this mutual capacitive touch method, a value sensed at the Rx electrode varies according to the touch or proximity of an object such as a finger or a pen. In the mutual capacitive touch method, it is possible to detect the presence or absence of a touch, touch coordinates, or the like using the value sensed at the Rx electrode.

In the self-capacitive touch method, which is another type of the capacitive touch method, after applying a driving signal to a touch electrode TE, the corresponding touch electrode TE may be sensed again. In such a self-capacitive touch method, a value sensed from the corresponding touch electrode TE varies depending on the proximity or touch of an object such as a finger or a pen. In the self-capacitive touch method, it is possible to detect the presence or absence of a touch, touch coordinates, or the like using the sensed value. In this self-capacitive touch method, since the touch electrode TE for applying a driving signal and the touch electrode TE for sensing the driving signal are the same, a Tx electrode and an Rx electrode may not be distinguished from each other.

The display device 100 may adopt one of the above-described two electrostatic touch methods (the mutual electrostatic capacitive touch method and the self-electrostatic capacitive touch method). Herein, for the convenience of description, an embodiment will be described on the assumption that a self-electrostatic capacitive touch method is adopted.

Meanwhile, the display device 100 may be divided into a display section and a touch section so as to drive the touch electrodes TE. As an example, in the touch sensing circuit 120-2 of the display device 100, a driving signal may not be applied to all or some of the touch electrodes TE in the section to which a data signal is supplied.

In addition, in the display device 100, the touch electrodes TE may be driven without dividing the display device 100 into a display section and a touch section. As an example, in the touch sensing circuit 120-2 of the display device 100, a driving signal may be applied to all or some of the touch electrodes TE in the section to which a data signal is supplied.

Figure 2:
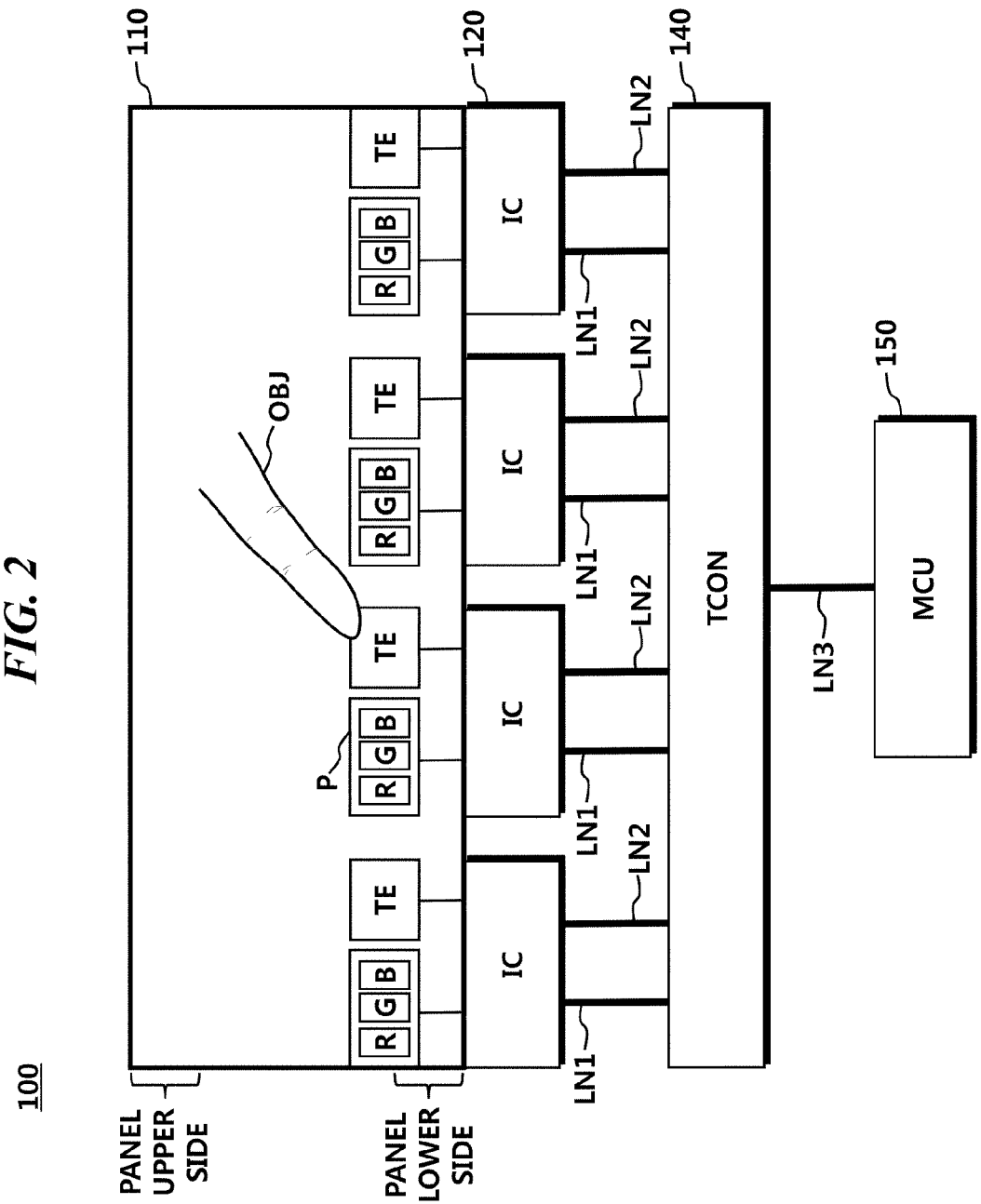
FIG. 2 is a diagram for describing a connection between a panel and a panel driving circuit according to an embodiment.

FIG. 2 is a diagram for describing connection between a panel and a panel driving circuit according to an embodiment.

Referring to FIG. 2, the display device 100 according to an embodiment may further include a microcontroller (MCU) 150. The microcontroller 150 may receive touch sensing data for a touch or proximity of an external object OBJ from the integrated circuit 120, generate coordinates, and transmit the coordinates to a host. Depending on the design, the timing controller 140 may generate the coordinates and transmit the coordinates to the host. In addition, the integrated circuit 120 may include a touch sensing circuit (not illustrated) together with a data driving circuit (not illustrated), thereby not only outputting a data voltage according to image data, but also sensing a touch or proximity of an external object (OBJ).

Some of the panel driving circuits of the display device 100 according to an embodiment may be integrated and disposed on one side surface of the panel 110. For example, the integrated circuits 120 including the data driving circuit, the pixel sensing circuit, and the touch sensing circuit, the timing controller 140, and the microcontroller 150 may be disposed only on the lower side of the panel 110 (PANEL LOW SIDE).

The display device 100 may include a plurality of integrated circuits (IC) 120 and a timing controller 140 and a microcontroller 150 configured to control the integrated circuits 120.

For example, in the above-described example, the data driving circuits of the integrated circuits 120 may drive a total of 3864 data channels to output a data voltage according to image data. The display device 100 may include four integrated circuits 120 that share and drive data channels. Each of the four integrated circuits 120 may drive 966 data channels.

Meanwhile, in the above-described example, the touch sensing circuits of the integrated circuits 120 may drive a total of 180 touch sensing channels to sense the touch or proximity of the external object OBJ. The display device 100 may include four integrated circuits 120 that share and drive touch sensing channels. Each of the four integrated circuits 120 may drive 45 touch sensing channels. Alternatively, only some of the plurality of integrated circuits 120 may include touch sensing circuits. The display device 100 may include two integrated circuits 120 that share and drive touch sensing channels. Each of the two integrated circuits 120 may drive 90 touch sensing channels.

On the lower side of the panel 110, the timing controller 140 may transmit image data to the integrated circuits 120 via a first communication line LN1. The timing controller 140 may transmit image data through an embedded clock point-point interface (EPI) method or a clock embedded data signaling (CEDS) method via the first communication line LN1.

On the lower side of the panel 110, the integrated circuits 120 may drive the touch electrodes TE and transmit touch sensing data regarding a touch or proximity of an external object OBJ to the timing controller 140. The integrated circuits 120 may transmit touch sensing data via the second communication line LN2 through a low-voltage differential signaling (LVDS) method.

Meanwhile, the timing controller 140 may transmit touch sensing control data for controlling the touch sensing circuit to the touch sensing circuit. The timing controller 140 may transmit the touch sensing control data via the first communication line LN1 through the EPI method or the CEDS method. Here, the touch sensing control data may be included in an image signal together with the image data and may be transmitted from the timing controller 140 to the integrated circuit 120.

Here, the timing controller 140 may relay data between the integrated circuits 120 and the microcontroller 150. For example, the timing controller 140 may receive touch sensing data for a touch or proximity of an external object OBJ from the integrated circuits 120 and transmit the touch sensing data to the microcontroller 150. The timing controller 140 may receive touch sensing control data from the microcontroller 150 and transmit the touch sensing control data to the integrated circuit 120. The touch sensing data and the touch sensing control data may be transmitted via a third communication line LN3 through a serial peripheral interface (SPI) method or an inter-integrated circuit (I2C) method.

Figure 3:
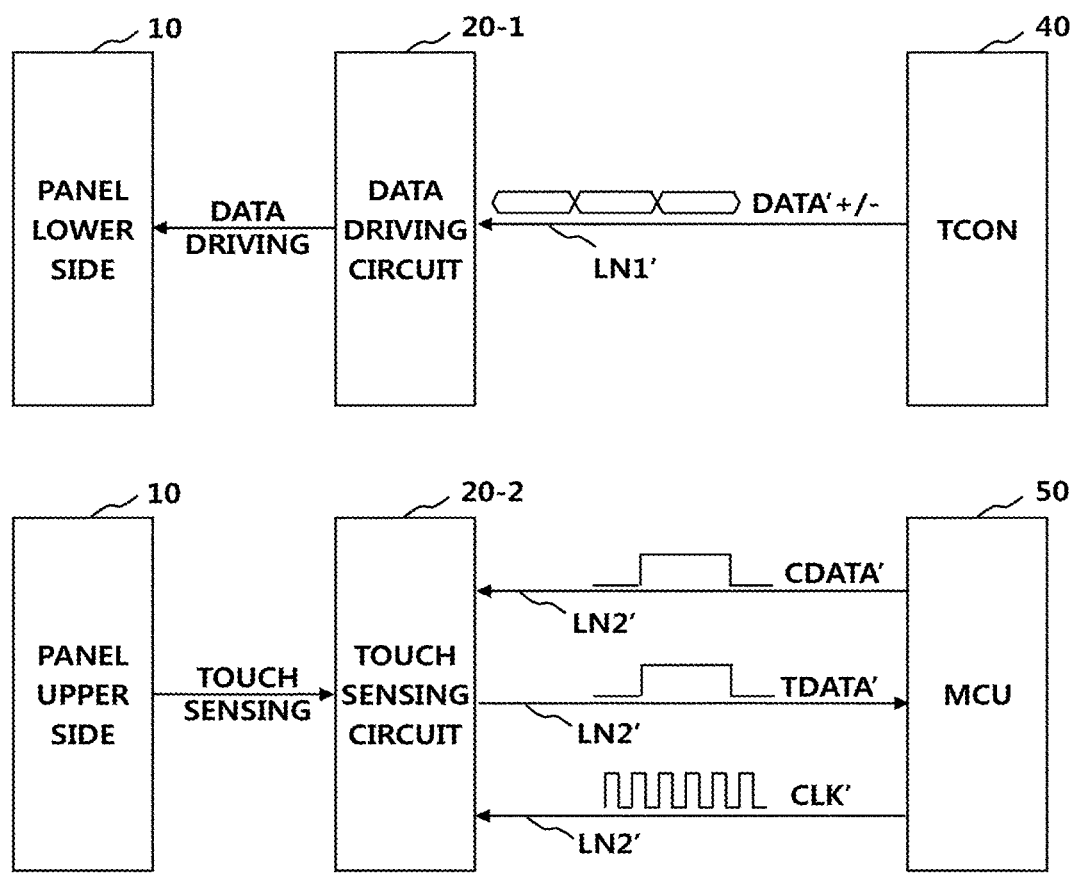
FIG. 3 is a diagram for describing a location and an interface where data driving and touch sensing occur based on a panel according to the related art.

FIG. 3 is a diagram for describing a location and an interface where data driving and touch sensing occur based on a panel according to the related art.

Referring to FIG. 3, in the related art, data driving may occur at one side of the panel, and touch sensing may occur at the other side of the panel.

For example, a data driving circuit 20-1 may be disposed at the lower side of the panel. The data driving circuit 20-1 may apply a data voltage corresponding to image data from the lower side of the panel.

In addition, a timing controller 40 communicating with the data driving circuit 20-1 may be disposed at the lower side of the panel. Therefore, the timing controller 40 may transmit image data DATA'+/− in the form of a differential signal to the data driving circuit 20-1 via a first' communication line LN1'. Here, the image data DATA'+/− may be transmitted via a CEDS interface.

Meanwhile, a touch sensing circuit 20-2 may be disposed at the upper side of the panel so as to perform a touch sensing function. The touch sensing circuit 20-2 may sense a touch or proximity of an external object at the upper side of the panel.

A microcontroller 50 communicating with the touch sensing circuit 20-2 may be disposed at the upper side of the panel. Therefore, the microcontroller 50 may transmit control data CDATA' a clock CLK' for the touch sensing circuit 20-2 to the touch sensing circuit 20-2 via a second' communication line LN2'. In addition, the touch sensing circuit 20-2 may transmit touch sensing data TDATA' to the microcontroller 50 via the second' communication line LN2'. Here, the control data CDATA', the clock CLK', and the touch sensing data TDATA' may be transmitted via an SPI interface.

As described above, with the interface between the data driving circuit 20-1 and the touch sensing circuit 20-2 of the prior art, image data is transmitted via the CEDS interface at the lower side of the panel, and touch sensing data is transmitted via the SPI interface at the upper side of the panel. In the case of the SPI interface, even in a section in which the touch sensing circuit does not operate (i.e., a section in which the data driving circuit 20-1 drives the panel), it is necessary for the microcontroller 50 to continuously generate a clock CLK' and to transmit the clock CLK' to the touch sensing circuit 20-2. Therefore, resources of the entire system are wasted, and electromagnetic interference may increase due to the large swing range of the SPI.

Figure 4:
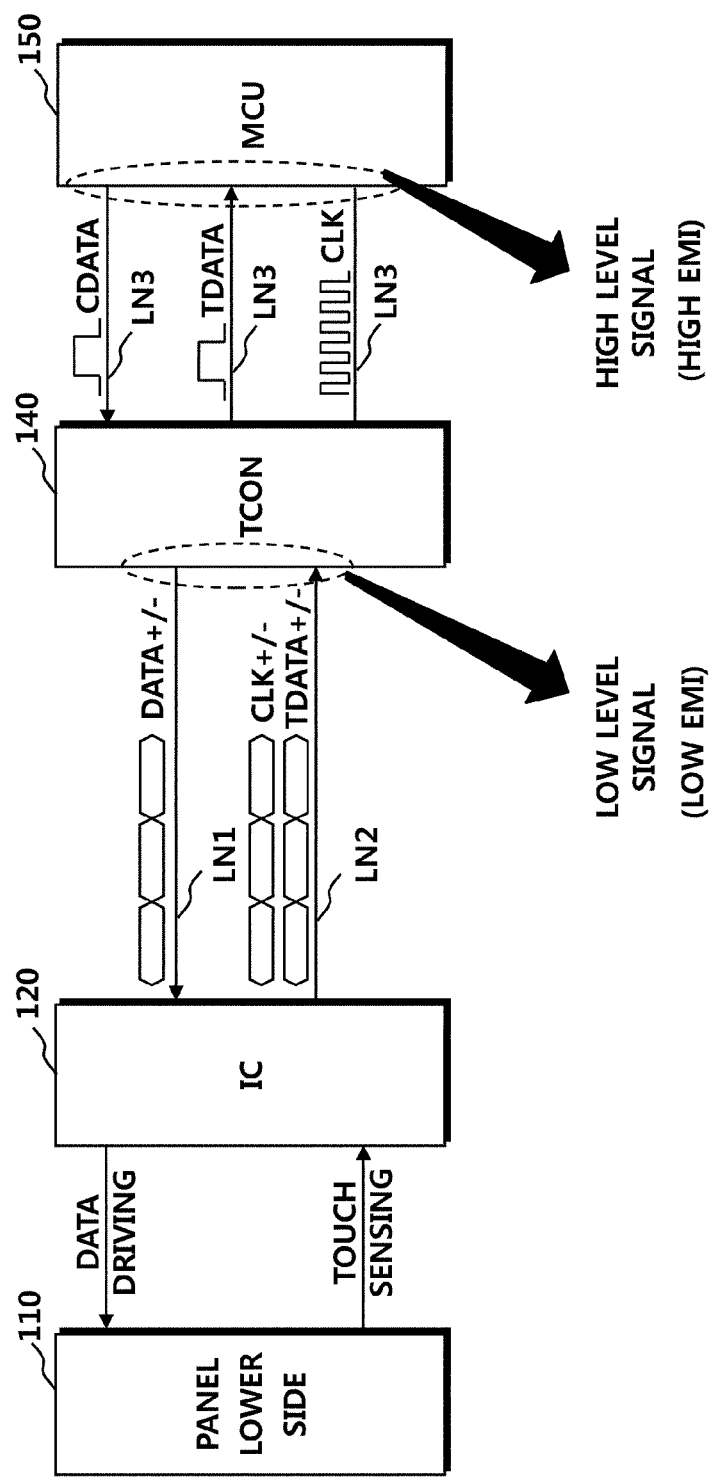
FIG. 4 is a diagram for describing a location and an interface where data driving and touch sensing occur based on a panel according to an embodiment.

FIG. 4 is a diagram for describing a location and an interface where data driving and touch sensing occur based on a panel according to an embodiment.

Referring to FIG. 4, according to an embodiment, data driving and touch sensing may occur at one side of the panel.

For example, an integrated circuit 120 may be disposed at the lower side of a panel. The integrated circuit 120 not only supplies a data voltage corresponding to image data, but also senses a touch or proximity of an external object, at the lower side of the panel.

In addition, a timing controller 140 communicating with the integrated circuit 120 may be disposed at the lower side of the panel. Therefore, the timing controller 140 may transmit image data DATA+/− in the form of a differential signal to the integrated circuit 120 via a first communication line LN1. Here, the image data DATA'+/− in the form of a differential signal may be transmitted via a CEDS interface.

In addition, the integrated circuit 120 may transmit touch sensing data TDATA+/− in the form of a differential signal and a clock CLK+/− in the form of a differential signal to the timing controller 140 via a second communication line LN2. Here, the touch sensing data TDATA+/− in the form of a differential signal and a clock CLK+/− in the form of a differential signal may be transmitted via an LVDS interface.

In addition, a microcontroller 150 communicating with the timing controller 140 may be disposed at the lower side of the panel. Therefore, the microcontroller 150 may transmit the touch sensing control data CDATA and a clock CLK for the touch sensing circuit of the integrated circuit 120 to the timing controller 140 via a third communication line LN3 through an SPI method. In addition, the timing controller 140 may transmit touch sensing data TDATA to the microcontroller 150 via a third communication line LN3 through the SPI method.

As described above, with the interface of the integrated circuit 120 according to an embodiment, at the lower side of the panel, image data may be transmitted via the CEDS interface, and touch sensing data may be transmitted via the LVDS interface. When the touch sensing data is transmitted via the LVDS interface, in the section in which the touch sensing circuit does not operate, i.e., the section in which the data driving circuit drives the panel, it is not necessary for the timing controller 140 or the microcontroller 150 to continuously generate a clock CLK and transmit the clock CLK to the integrated circuit 120. This is because the integrated circuit 120 is capable of restoring a clock embedded in image data received via the CEDS interface, and capable of using the restored clock. This process will be described later. Therefore, the resources of the entire system can be efficiently used, and electromagnetic interference can be reduced due to the small swing range of CEDS and LVDS (LOW LEVEL SIGNAL (LOW EMI)). In contrast, since the SPI interface is still used between the timing controller 140 and the microcontroller 150, electromagnetic interference may increase due to the large swing range (HIGH LEVEL SIGNAL (HIGH EMI)).

Figure 5:
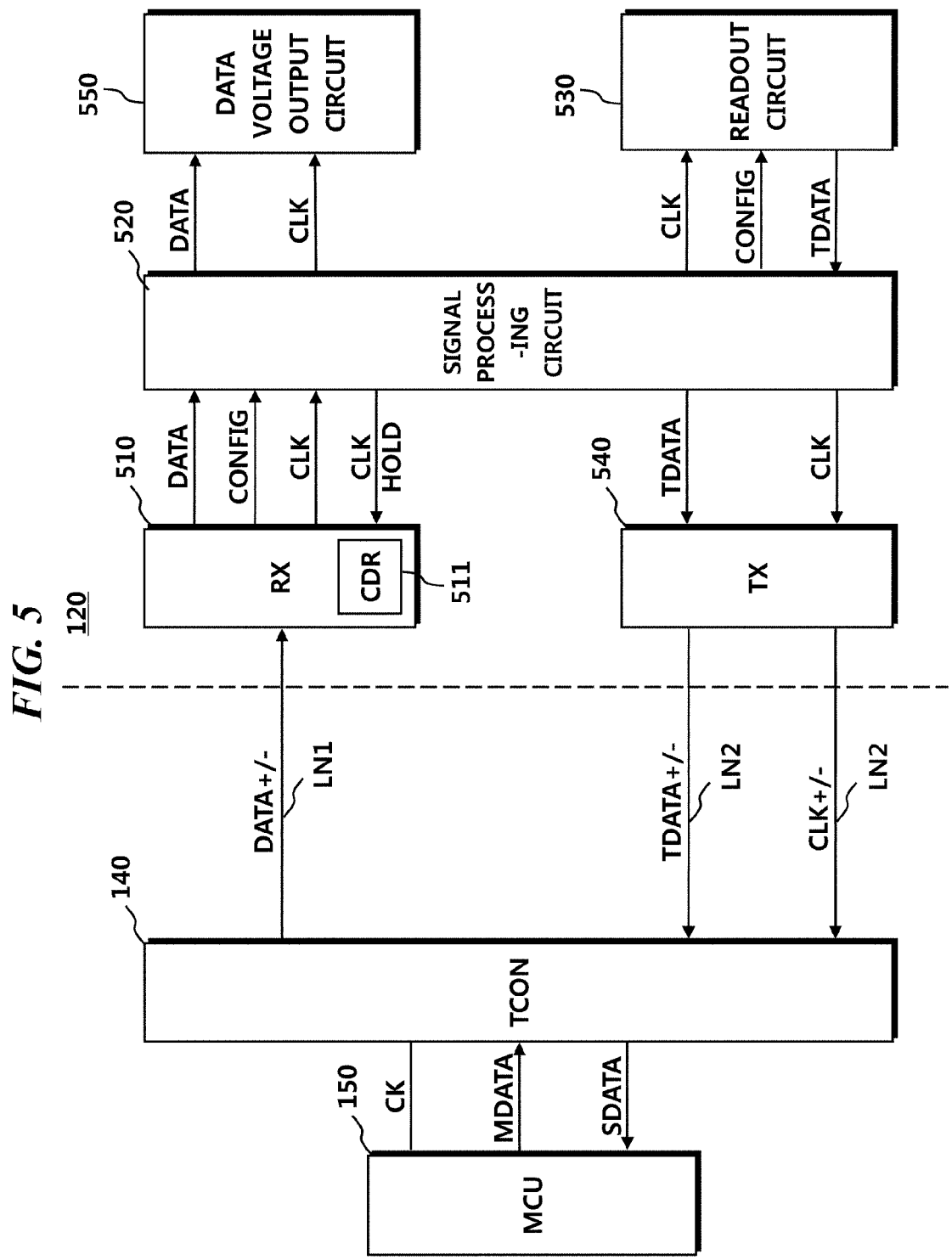
FIG. 5 is a block diagram of an integrated circuit according an embodiment.

FIG. 5 is a block diagram of an integrated circuit according an embodiment.

Referring to FIG. 5, an integrated circuit 120 may include a receiving circuit (RX) 510, a clock data restoration circuit 511, a signal processing circuit 520, a readout circuit 530, a transmitting circuit (TX) 540, and a data voltage output circuit 550.

The receiving circuit 510 may receive an image signal including image data DATA from the timing controller 140 via a first communication line LN1. Between the timing controller 140 and the receiving circuit 510, the image data DATA may be transmitted in the form of a differential signal through a CEDS method.

In addition, the image signal may include an embedded clock CLK, and the receiving circuit 510 may extract or restore the clock CLK from the image signal.

In addition, the image signal may further include a touch sensing control signal CONFIG for setting the readout circuit 530. By receiving the image signal, the receiving circuit 510 may also receive a touch sensing control signal CONFIG in addition to the image data DATA.

The receiving circuit 510 may receive a clock hold signal CLK HOLD from the signal processing circuit 520. The clock hold signal CLK HOLD may operate the clock data restoration circuit 511 to generate the same clock CLK restored by the clock data restoration circuit 511 even in the period in which no image signal is received.

The signal processing circuit 520 may receive data from outside the integrated circuit 120, align the data, and transmit the aligned data back to outside the integrated circuit 120. The signal processing circuit 520 may include a digital circuit in order to align data.

For example, the signal processing circuit 520 may receive and align the image data DATA and transmit the aligned image data DATA to the data voltage output circuit 550. Alternatively, the signal processing circuit 520 may transmit a clock CLK restored from the image data DATA to the readout circuit 530, the transmitting circuit 540, or the data voltage output circuit 550. In addition, the signal processing circuit 520 may receive a touch sensing control signal CONFIG from the receiving circuit 510 and transmit the touch sensing control signal CONFIG to the readout circuit 530. In addition, the signal processing circuit 520 may receive touch sensing data TDATA from the readout circuit 530 and transmit the touch sensing data TDATA to the transmitting circuit 540.

The readout circuit 530 may generate a touch sensing signal including information on a touch or proximity of an external object. The touch sensing signal may include touch sensing data.

The readout circuit 530 may receive, from the signal processing circuit 520, a clock CLK and a touch sensing control signal CONFIG restored from an image signal. The readout circuit 530 may change a set value using the touch sensing control signal CONFIG and use the restored clock CLK for touch sensing.

The transmitting circuit 540 may transmit a touch sensing signal including touch sensing data TDATA to outside the integrated circuit 120 together with the restored clock CLK. Here, the transmission of the touch sensing data TDATA may be performed in a section in which an image signal is not received. The transmitting circuit 540 may receive the touch sensing data TDATA or the restored clock CLK via the signal processing circuit 520.

Meanwhile, the integrated circuit 120 may restore the clock CLK included in the image signal in a first section in which an image signal is received, and use the restored clock CLK in a second section in which an image signal is not received. To this end, the receiving circuit 510 may further include a clock data restoration circuit 511.

Meanwhile, the integrated circuit 511 may restore the clock CLK included in the image signal in the first section in which an image signal is received, and use the restored clock CLK in the second section in which an image signal is not received. The clock CLK restored in the first section may be used by the readout circuit 530 to sense a touch or proximity in the second section, or may be used to transmit touch sensing data TDATA to the timing controller 140.

When the clock CLK is restored once in the first section, the clock data restoration circuit 511 may continuously maintain the restored clock CLK in the second section. For example, when a first clock is included in an image signal, an oscillator of the clock data restoration circuit 511 may be set to generate a second clock, which is the same as the first clock in the first section, and the oscillator may continuously generate the second clock based on the set state in the first section. Then, in the second section, the transmitting circuit 540 may transmit touch sensing data to the timing controller 140 together with the second clock.

The clock data restoration circuit 511 may be included in the receiving circuit 510, but is not limited thereto, and may be disposed outside the receiving circuit 510.

Meanwhile, the receiving circuit 510 and the transmitting circuit 540 may transmit and receive signals with the timing controller 140 using different interfaces. In addition, the receiving circuit 510 may use a method in which a clock is embedded in data and transmitted. The transmitting circuit 540 may use a method in which a clock is transmitted separately from data.

The receiving circuit 510 may receive an image signal in which a clock CLK is embedded in image data DATA from the timing controller 140 using the CEDS interface. In the CEDS interface, the receiving circuit 510 may receive image data DATA+/− in the form of a differential signal. Alternatively, the receiving circuit 510 may use the EPI interface instead of the CEDS interface.

In contrast, the transmitting circuit 540 may transmit the touch sensing data TDATA and a clock CLK to the timing controller 140 using the LVDS interface. Here, the clock CLK may be restored from an image signal in the first section and transmitted to the timing controller 140 by the transmitting circuit 540 in the second section. In the LVDS interface, the transmitting circuit 540 may transmit touch sensing data TDATA+/− in the form of a differential signal and a clock CLK+/− in the form of a differential signal.

Meanwhile, the timing controller 140 may transmit an image signal to the integrated circuit 120. The timing controller 140 may transmit image data DATA+/− in the form of a differential signal having a clock CLK embedded therein to the integrated circuit 120 via the first communication line LN1.

In addition, the timing controller 140 may receive a touch sensing signal from the integrated circuit 120. The integrated circuit 140 may receive touch sensing data TDATA+/− in the form of a differential signal and a clock CLK+/− in the form of a differential signal via the second communication line LN2.

In addition, the microcontroller 150 may transmit and receive signals to and from the timing controller 140 using an interface different from the interface used by the receiving circuit 510 and the transmitting circuit 540. Here, the interface used by the microcontroller 150 may include an SPI interface. For example, the microcontroller 150 may transmit or receive a clock to or from the timing controller 140. The microcontroller 150 may transmit master data MDATA to the timing controller 140. The timing controller 140 may transmit slave data SDATA to the microcontroller 150. Here, the master data MDATA may mean data sent to the timing controller 140 by the microcontroller 150, and the slave data SDATA may mean data sent to the microcontroller 150 by the timing controller 140.

Figure 6:
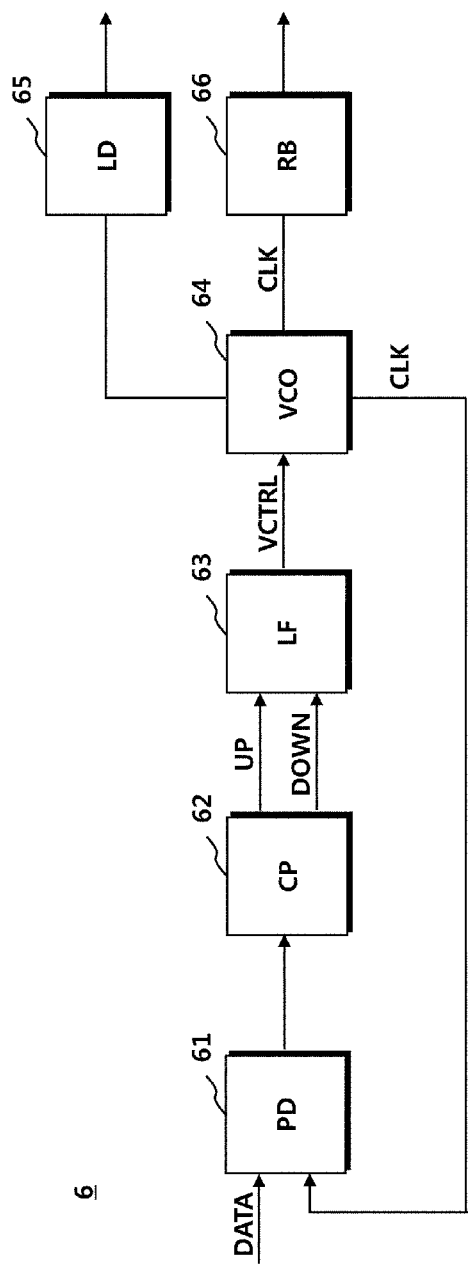
FIG. 6 is a block diagram of a conventional clock data restoration circuit.

FIG. 6 is a block diagram of a conventional clock data restoration circuit.

Referring to FIG. 6, in the related art, a clock data restoration circuit 6 may include a phase detector (PD) 61, a charge pump (CP) 62, a loop filter (LF) 63, a voltage-controlled oscillator (VCO) 64, a lock detector (LD) 65, and a retiming block (RB) 66 in order to restore a clock from an image signal.

The clock data restoration circuit 6 may extract or restore a clock included in image data DATA. The clock data restoration circuit 6 may generate an arbitrary clock via the voltage-controlled oscillator 64 and compare the generated clock with image data DATA, which is a reference signal. When the generated clock and the image data DATA match, the clock data restoration circuit 6 may read the image data DATA using the generated clock. If the generated clock and the image data DATA do not match, the clock data restoration circuit 6 may regenerate an arbitrary clock by adjusting the set value of the voltage-controlled oscillator 64. Until the generated clock and the image data DATA match, the clock data restoration circuit 6 may repeat generation of an arbitrary clock. Here, the image data DATA may have a format specially preprocessed to restore the clock.

The phase detector 61 may compare the phases and frequencies of a reference signal and a clock CLK output from the voltage-controlled oscillator 64 and transmit the result of the comparison to the charge pump 62. Here, the reference signal may include image data DATA.

The charge pump 62 may receive the result of the comparison from the phase detector 61, and the loop filter 63 outputs a control voltage VCTRL in response to a first control signal UP and a second control signal DOWN. The first control signal UP and the second control signal DOWN may adjust the control voltage VCTRL for controlling the oscillator 64. For example, the first control signal UP may increase the level of the control voltage VCTRL, and the second control signal DOWN may decrease the level of the control voltage VCTRL.

Before the control voltage VCTRL is input to the oscillator 64, the loop filter 63 may low-pass filter the control voltage VCTRL and output the filtered control voltage VCTRL to the voltage-controlled oscillator 64.

The voltage-controlled oscillator 64 may generate a clock CLK having an arbitrary phase and an arbitrary frequency. The phase and frequency of the clock CLK may vary depending on the set value of the voltage-controlled oscillator 64. Here, the set value may include a voltage value, and the phase and the frequency of the clock CLK may vary depending on the control voltage VCTRL. The clock CLK may be compared with the image data DATA which is a reference signal by the phase detector 61.

The lock detection circuit 65 may detect a lock for the clock CLK. When the phase of the clock CLK matches the phase of the image data DATA, the lock detection circuit 65 may generate a lock-on signal based on the occurrence of the lock.

The retiming circuit 66 may read the image data DATA using the clock CLK. When the clock CLK is synchronized with the image data DATA and the lock-on signal is generated, the retiming circuit 66 may read the image data DATA again using the lock-on clock CLK.

Figure 7:
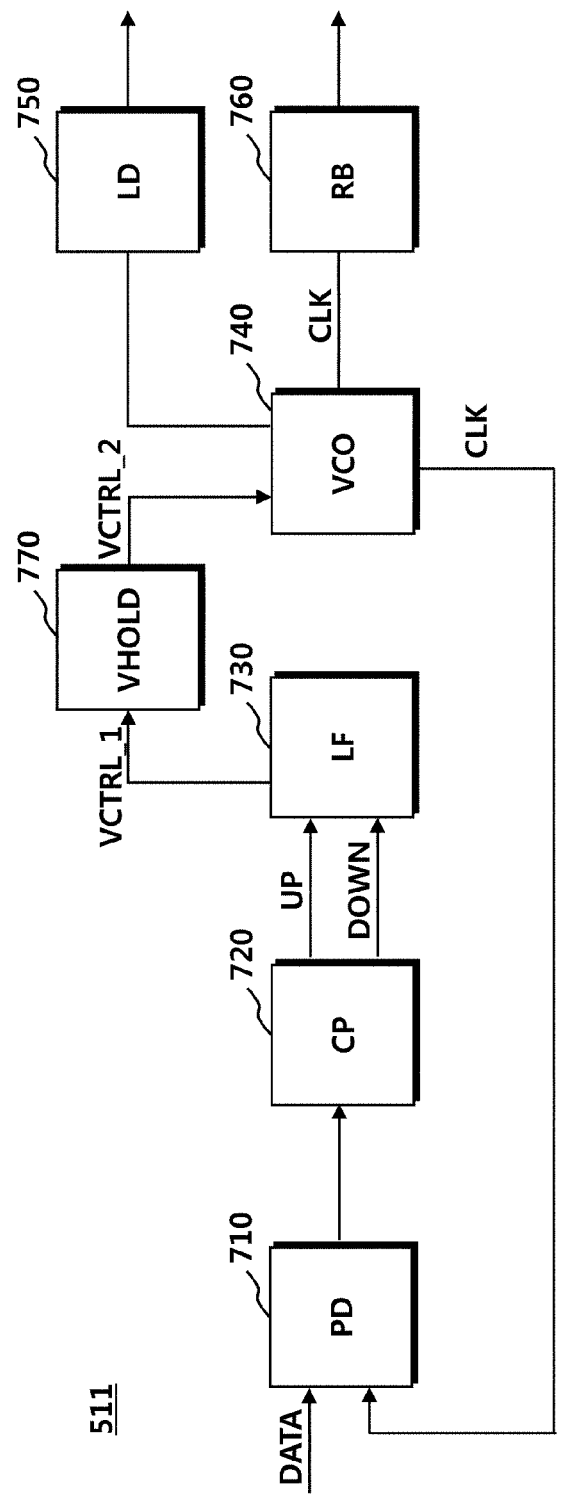
FIG. 7 is a block diagram of a clock data restoration circuit including an oscillation control circuit according to an exemplary embodiment.

FIG. 7 is a block diagram of a clock data restoration circuit including an oscillation control circuit according to an exemplary embodiment.

Referring to FIG. 7, a clock data restoration circuit 511 according to an embodiment may include a phase detector 710, a charge pump 720, a loop filter 730, a voltage-controlled oscillator 740, a lock detection circuit 750, and a retiming circuit 760 in order to restore a clock CLK from an image signal in a section in which an image signal is received, for example, a first section.

In addition, the clock data restoration circuit 511 may further include an oscillation control circuit (VHOLD) 770 in order to continuously generate a restored clock CLK in a section in which an image signal is not received, for example, a second section. The clock CLK generated in the second section may be used to transmit touch sensing data.

The clock data restoration circuit 511 may restore a clock CLK included in the image data DATA in the first section in which an image signal is received. The clock CLK generated by the voltage-controlled oscillator 740 in the first section may be referred to as a restored clock CLK.

The clock data restoration circuit 511 continuously generates a clock CLK in the second section in which an image signal is not received, and the generated clock CLK may be used for a readout circuit. Here, the generation of the clock CLK may mean that the clock data restoration circuit 511 repeatedly generates a clock CLK according to a setting state of the voltage-controlled oscillator 740 held therein. The clock data restoration circuit 511 may hold the voltage-controlled oscillator 740. Here, the term "hold" may mean that the clock data restoration circuit 511 maintains or fixes the set state of the voltage-controlled oscillator 740 in which the clock CLK has been restored.

Specifically, in order to hold the oscillator 740 in the second section, the oscillation control circuit 770 may fix the set value of the oscillator 740. The oscillation control circuit 770 may control the oscillator 740 by adjusting the set value of the voltage-controlled oscillator 740, for example, a voltage value. The voltage-controlled oscillator 740 may generate a clock CLK having a different phase and/or frequency according to the set value. Therefore, in the second section, the oscillation control circuit 770 may hold the voltage-controlled oscillator 740 by fixing the set value of the first section, and the voltage-controlled oscillator 740 may repeatedly generate a clock CLK having a specific phase and/or frequency according to the fixed set value.

For example, in this drawing, while restoring the clock CLK in the first section, the oscillation control circuit 770 may receive a first control voltage VCTRL_1 from the loop filter 730 and output a second control voltage to the oscillator 740 (VCTRL_2). The voltage-controlled oscillator 740 may receive the second control voltage VCTRL_2 and generate a clock CLK. In the first section, since the clock CLK is generated until a lock-on signal is generated, the second control voltage VCTRL_2 may fluctuate as the first control voltage VCTRL_1 fluctuates. That is, when the first control voltage VCTRL_1 fluctuates in response to the first control signal UP or the second control signal DOWN, the second control voltage VCTRL_2 may also fluctuate.

In addition, in the second section, the oscillation control circuit 770 may hold the voltage-controlled oscillator 740. Even if the first control voltage VCTRL_1 fluctuates, the oscillation control circuit 770 may output a second control voltage VCTRL_2 that does not fluctuate. The second control voltage VCTRL_2 may have a fixed value. The oscillator 740 may receive the second control voltage VCTRL_2 having the fixed value and generate a clock CLK having a phase and/or frequency corresponding to the fixed value. When the oscillator 740 is held in this way, the oscillator 740 may generate a clock CLK having a specific phase and/or frequency.

In this way, the clock data restoration circuit 511 may use the state of the voltage-controlled oscillator 740 set in the first section in which the image signal is received, as it is, even in the second section in which no image signal is received. The oscillation control circuit 770 of the clock data restoration circuit 511 may fix the second control voltage VCTRL_2 in the first section and output the fixed second control voltage VCTRL_2 to the oscillator 740 in the second section. The oscillator 740 may continuously generate a clock CLK according to the second control voltage VCTRL_2 having a fixed value in the second period. The generated clock CLK may be used to transmit touch sensing data. Therefore, the clock data restoration circuit 511 may generate a clock CLK through the held oscillator 740 even in the second section in which no clock CLK can be restored and use the clock CLK for a touch sensing operation.

Figure 8:
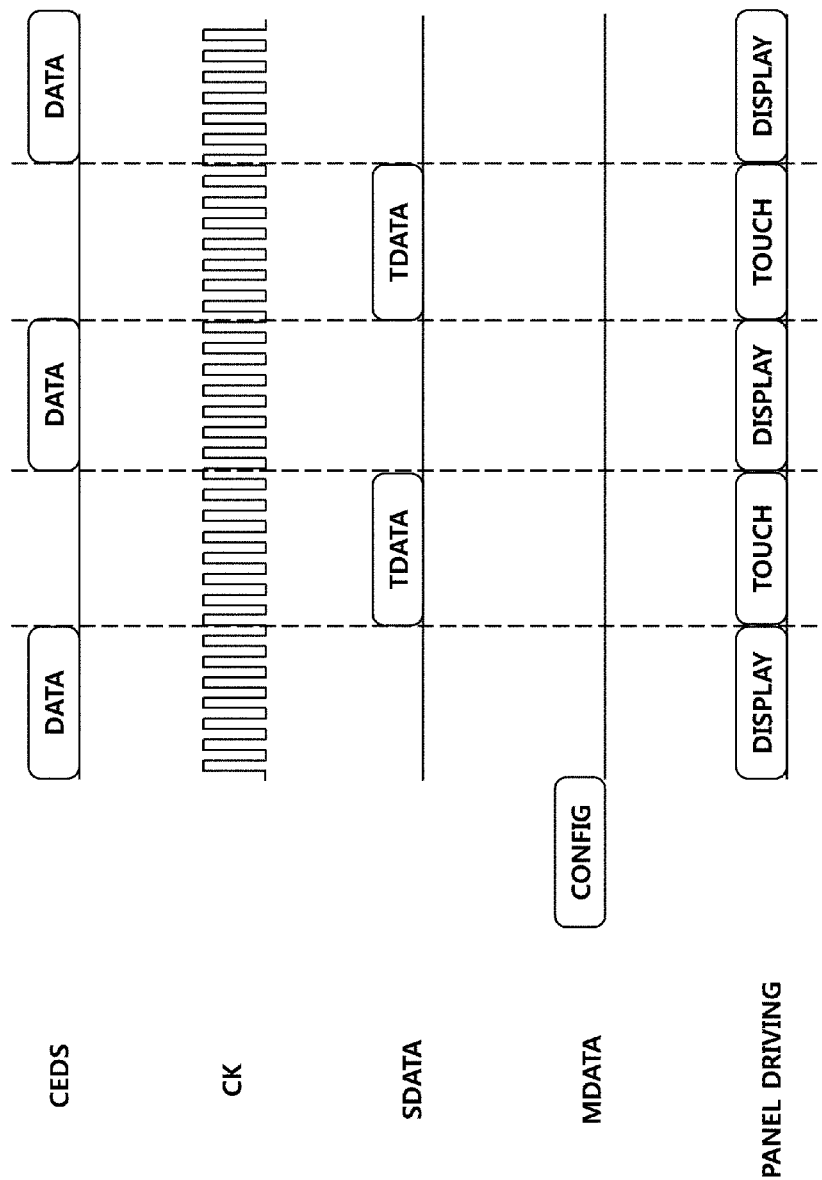
FIG. 8 is a diagram for describing timing of image data via a CEDS interface and touch sensing data via an SPI interface according to the related art.

FIG. 8 is a diagram for describing timing of image data via a CEDS interface and touch sensing data via an SPI interface according to the related art.

Referring to FIG. 8, display and touch sensing may be implemented in time division. During a display section, a data voltage corresponding to image data is output to the panel, and a change in capacitance may be sensed on the panel during the touch section. In the touch section, the panel may receive a load free driving (LFD) signal for removing parasitic capacitance around a touch electrode. In this drawing, the display section may be indicated as DISPLAY, and the touch section may be indicated as TOUCH.

In the related art, image data DATA may be transmitted and received between a timing controller and a data driving circuit via a CEDS interface in a display section.

A signal related to touch sensing data TDATA may be transmitted and received between the touch sensing circuit and the microcontroller via an SPI interface in the touch section.

For example, the touch sensing circuit may transmit slave data SDATA including the touch sensing data TDATA to the microcontroller in the touch section. The microcontroller may transmit master data (MDATA) including a touch sensing control signal CONFIG to the touch sensing circuit in the touch section.

On the other hand, in the SPI interface, the clock CK may be transmitted and received in both the display section and the touch section. Since a clock CK for transmitting the touch sensing data TDATA is required only in the touch section, transmission and reception of the clock CK in the display section may waste system resources and increase electromagnetic interference.

Figure 9:
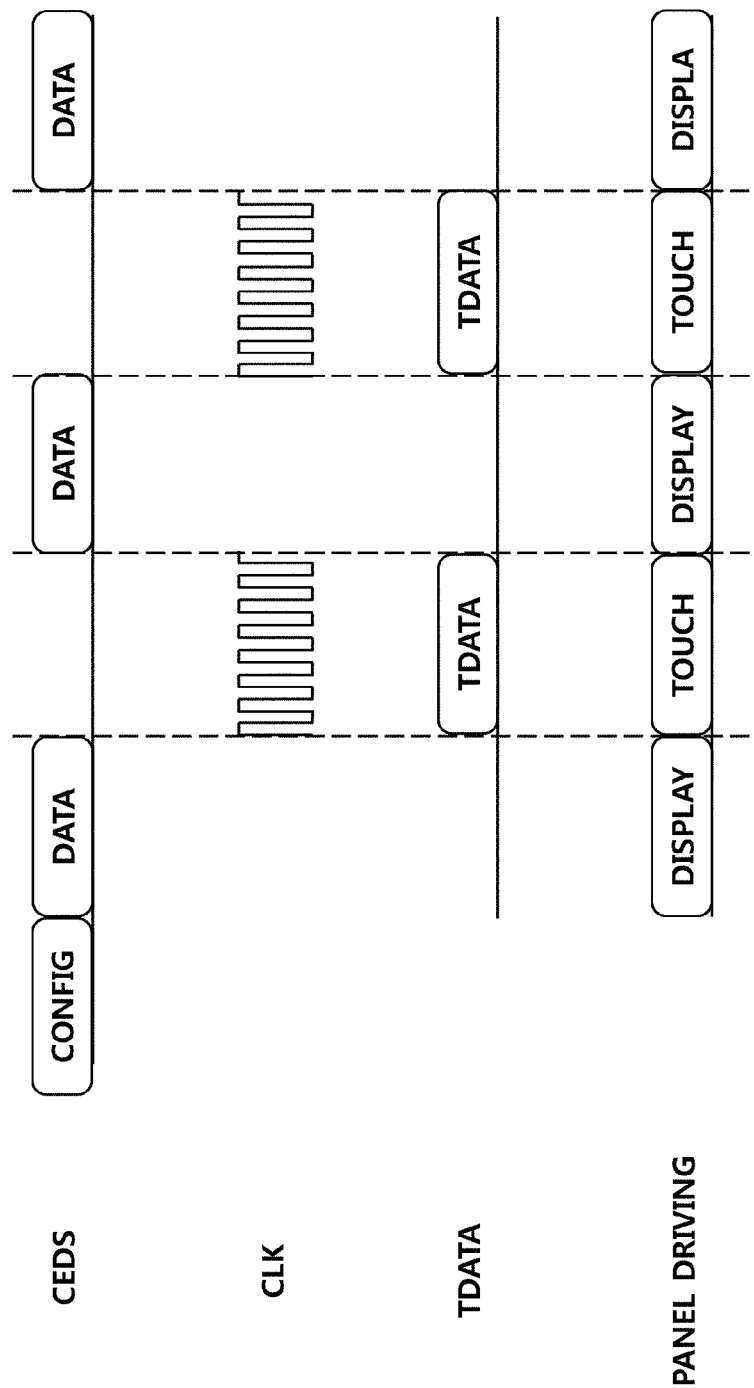
FIG. 9 is a diagram for describing timing of image data via a CEDS interface and touch sensing data via an LVDS interface according to an embodiment.

FIG. 9 is a diagram for describing timing of image data via a CEDS interface and touch sensing data via an LVDS interface according to an embodiment.

Referring to FIG. 9, according to an embodiment, image data DATA may be transmitted and received between a timing controller and an integrated circuit via a CEDS interface in a display section.

A signal related to touch sensing data TDATA may be transmitted and received between a timing controller and an integrated circuit via an LVDS interface or a CEDS interface in a touch section.

For example, the integrated circuit may transmit touch sensing data TDATA to the timing controller together with a clock CLK in a touch section. The clock CLK and the touch sensing data TDATA may be transmitted and received via the LVDS interface at the same timing. Here, the clock CLK may be restored from the image data DATA in the display section, or may be a clock CLK generated from the restored clock CLK.

The timing controller may transmit image data DATA and a touch sensing control signal CONFIG to the integrated circuit. The touch sensing control signal CONFIG has previously been transmitted through the SPI interface, but according to an embodiment, the touch sensing control signal CONFIG may be transmitted together with the image data DATA via the CEDS interface.

In this way, the clock CLK may be limitedly transmitted and received only in a touch section. In addition, the clock included in the image data DATA may be restored in the display section and used even in a touch section. Since the clock CLK does not need to be transmitted in all sections, efficient use of system resources may be enabled. Since an SPI interface need not be used, electromagnetic interference can be reduced.

While the disclosure has been particularly shown and described with reference to one embodiment and several alternate embodiments, it will be understood by persons skilled in the relevant art that various changes in form and details can be made therein without departing from the spirit and scope of the invention.

What is claimed is:

1. An integrated circuit comprising:
a receiving circuit configured to receive an image signal having a clock embedded in the image signal;
a clock data restoration circuit configured to restore the clock from the image signal;
a readout circuit configured to generate a touch sensing signal for sensing a touch or proximity of an external object; and
a transmitting circuit configured to transmit the touch sensing signal to a timing controller using the restored clock,
wherein the receiving circuit is configured to receive the image signal from the timing controller using a first interface, the transmitting circuit is configured to transmit the touch sensing signal to the timing controller using a second interface, and the timing controller is configured to transmit the touch sensing signal to a microcontroller using a third interface, and
wherein the first interface, the second interface, and the third interface are different from each other.

2. The integrated circuit of claim 1, wherein the clock data restoration circuit is configured to restore the clock in a first section in which the image signal is received and to maintain the clock, restored in the first section, in a second section in which the image signal is not received.

3. The integrated circuit of claim 2, wherein the transmitting circuit is configured to transmit the touch sensing signal to the timing controller in the second section.

4. The integrated circuit of claim 3, wherein the clock data restoration circuit comprises a voltage-controlled oscillator configured to control a phase of the clock in response to a control voltage and is configured to restore the clock using the voltage-controlled oscillator.

5. The integrated circuit of claim 4, wherein the clock data restoration circuit comprises an oscillation control circuit configured to control the voltage-controlled oscillator by adjusting the control voltage, the oscillation control circuit is configured to adjust the control voltage during the first section, and the voltage-controlled oscillator is configured to restore the clock according to the control voltage during the first section.

6. The integrated circuit of claim 5, wherein the oscillation control circuit is configured to fix the control voltage during the second section, and the voltage-controlled oscillator is configured to maintain the clock according to the fixed control voltage.

7. The integrated circuit of claim 1, wherein, in the first interface, a clock is transmitted in a state of being embedded in data, and in the second interface, a clock is transmitted separately from data.

8. The integrated circuit of claim 7, wherein the receiving circuit is configured to receive a touch sensing control signal for setting the readout circuit via the first interface.

9. A display device comprising:
a timing controller configured to transmit an image signal having a clock embedded in the image signal;
an integrated circuit configured to restore the clock from the image signal generate a touch sensing signal for sensing a touch or proximity of an external object and to transmit the touch sensing signal to the timing controller using the restored clock; and
a microcontroller configured to receive the touch sensing signal through the timing controller,
wherein the timing controller is configured to transmit the image signal using a first interface, and the integrated circuit is configured to transmit the touch sensing signal to the timing controller using the restored clock via a second interface that is different from the first interface, and the timing controller is configured to transmit the touch sensing signal to the microcontroller using a third interface that is different from the first interface and the second interface.

10. The display device of claim 9, wherein the integrated circuit is configured to restore the clock in a first section in which the image signal is received and to output a data voltage corresponding to image data using the restored clock.

11. The display device of claim 10, wherein the integrated circuit is configured to transmit the touch sensing signal to the timing controller using the clock, restored in the first section, in a second section in which the image signal is not received.

12. The display device of claim 11, wherein the integrated circuit comprises a voltage-controlled oscillator configured to control a phase of the clock according to a control voltage and an oscillation control circuit configured to control the voltage-controlled oscillator by adjusting the control voltage, the oscillation control circuit is configured to adjust the control voltage during the first section in which the image signal is received and to fix the control voltage during the second section in which the image signal is not received, and the oscillator is configured to restore the clock according to the control voltage adjusted during the first section and to generate the clock according to the control voltage fixed during the second section.

* * * * *